Figure 1:
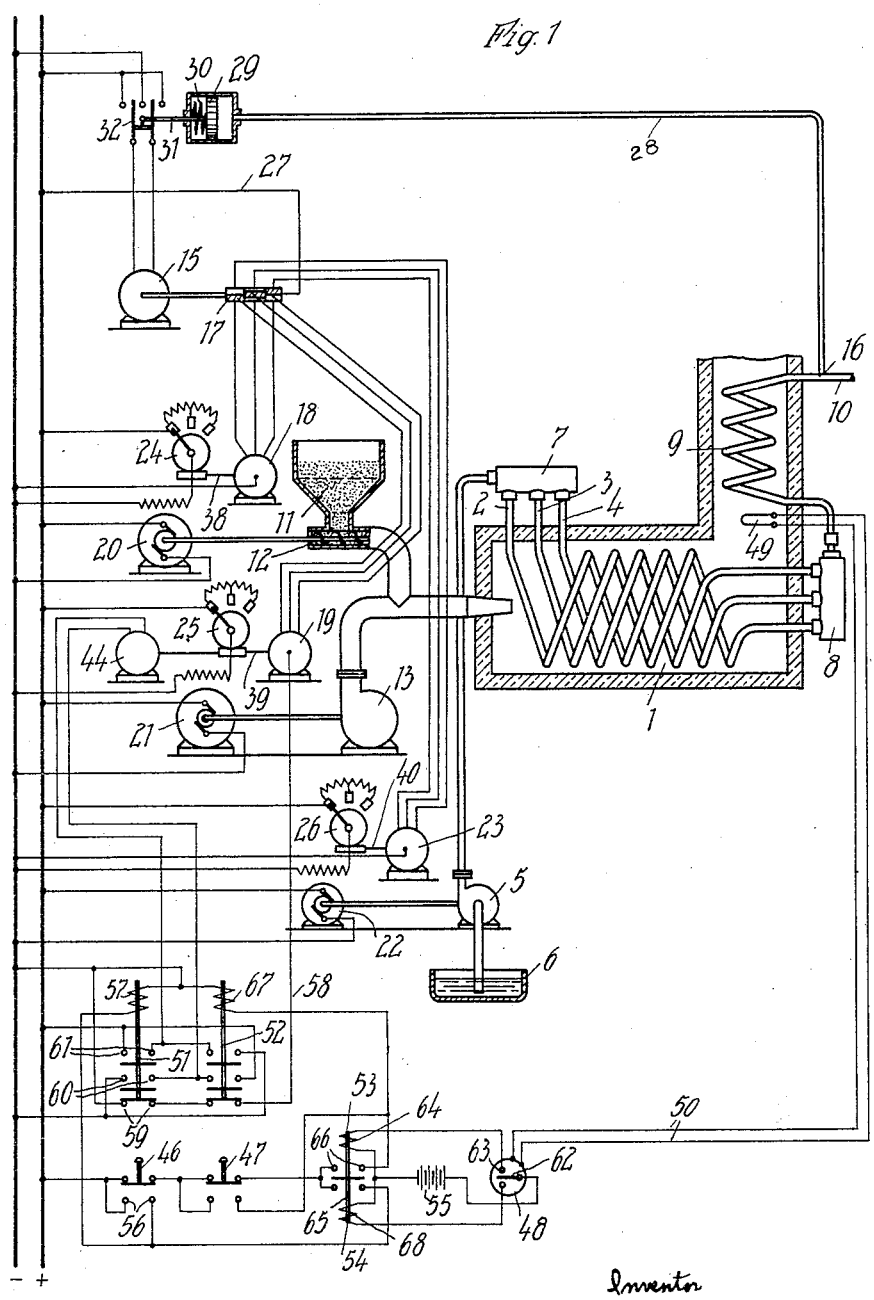

Aug. 30, 1932. H. RABE 1,874,619
AUTOMATIC FIRE REGULATION SYSTEM FOR STEAM BOILERS
Filed April 18, 1930 2 Sheets-Sheet 1

Inventor
Heinz Rabe
by Knight Bros
attorneys

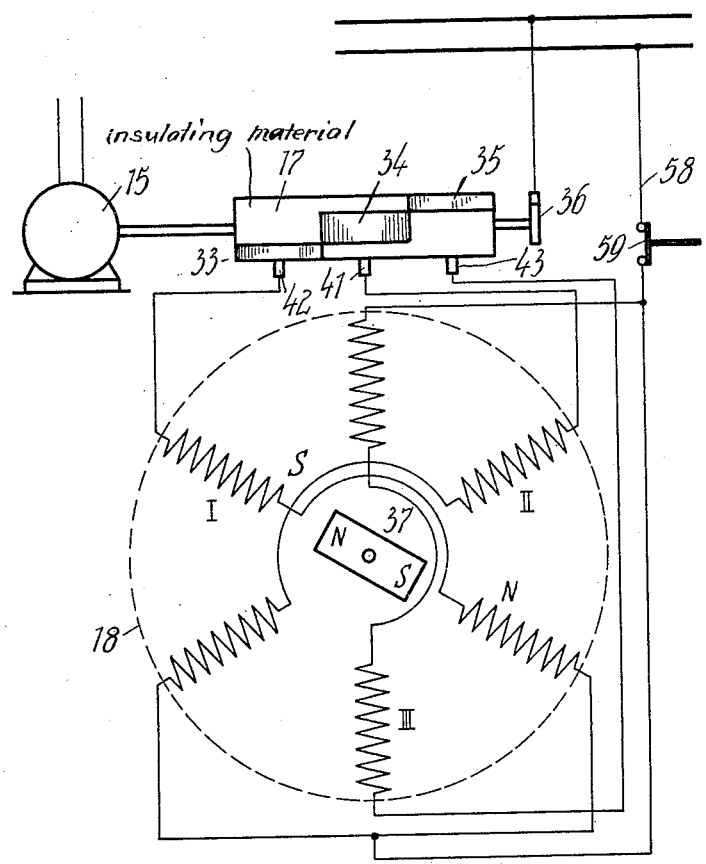

Patented Aug. 30, 1932

1,874,619

UNITED STATES PATENT OFFICE

HEINZ RABE, OF BERLIN-WILMERSDORF, GERMANY, ASSIGNOR TO SIEMENS-SCHUCK-ERTWERKE AKTIENGESELLSCHAFT, OF BERLIN-SIEMENSSTADT, GERMANY, A CORPORATION OF GERMANY

AUTOMATIC FIRE REGULATION SYSTEM FOR STEAM BOILERS

Application filed April 18, 1930, Serial No. 445,507, and in Germany April 5, 1929.

The invention relates to an automatic fire regulation system for steam boilers.

Steam boilers having a small water capacity or consisting merely of a system of heated tubes, possess only a small steam storage capacity. It is therefore necessary to convert approximately the entire amount of feed water fed into the boiler immediately into steam. If it is desired that the steam on leaving the boiler, should be in a certain state, for instance at a certain temperature, a definite amount of heat must be applied to the boiler. It is supplied by the fuel fed into the furnace which operates with an excess of air. If it is assumed that liquid, gaseous or pulverized fuel is blown into the furnace chamber and the thermal value of the fuel remains practically constant, and if it furthermore be assumed that the quantity of air required for the complete combustion is known, the feeding devices for fuel and air may be so combined with each other that a definite ratio can be permanently maintained between the quantity of fuel and the quantity of air. In boilers consisting only of a system of heated tubes it is also necessary to regulate the quantity of feed water supplied in dependence of the load. It is therefore advisable to connect the feed water pump also to the supply system for the fuel and the combustion air. In this way the result is attained that at varying loads of the boiler always sufficient steam of the desired state is supplied.

Various systems have already been proposed for solving this problem. My invention provides a new solution which consists in the use of a master control motor. This master motor is in turn controlled by an impulse (pressure, temperature or quantity impulse). By this master motor the adjusting or servo-motors which operate the speed regulating devices for the driving motors of the supply devices for fuel, combustion air and feed water, are so controlled that the speeds of these servo-motors bear a definite ratio to the speed of the master control motor and start and stop with this motor. This idea may, for instance, be reduced to practice by coupling a distributor fitted with several contact segments with the master motor. To these segments are connected the individual windings of the servo-motors. With a corresponding arrangement of the segments a rotary field is produced in the servo-motors which maintains these motors in absolutely fixed speed relation. The extent of regulation performed by each servo-motor can thus be accurately determined in each individual case by the ratio of gearing between the servo-motor and the regulating device driven by it.

Certain properties of the fuel (non-uniform condition, fluctuating thermal value) or changing conditions, such as dirty boilers render it necessary that the ratio once set between feed water, fuel and combustion air should be capable of variation by correction impulses. These may, for instance be given by variations in the $CO_2$ contents of the flue gases or in the steam temperature if the main impulse was a response to the medium quantity. To render possible such a change in the arrangement proposed, the servo-motors at their fixed speed ratio to the master motor speed may according to my invention be combined with standard auxiliary motors upon which the correction impulse acts.

The servo and the auxiliary motor may in each case either be mounted on the same shaft or both may be connected by a double throw clutch. In the latter case the servo-motor is uncoupled when the auxiliary motor is switched in. An electric coupling may also be provided between the two motors; in this case also the servo-motor is switched off when the auxiliary motor is switched in.

An embodiment of the invention is illustrated in the drawings, in which Fig. 1 represents a general diagrammatic lay-out of the system, and Fig. 2 the details of the rotating contact mechanism 17 in Fig. 1. Referring to Fig. 1, 1 is the combustion chamber of a boiler consisting of the parallel tube systems 2, 3 and 4 which traverse the radiation chamber 1 in coils and linearly. The feed water is forced by the pump 5 from the feed tank 6 into the distributor 7 to which the parallel tubes 2, 3 and 4 are connected. The steam generated is collected in the header 8 and thence passes into the superheater 9, the superheated steam being delivered to the consumers through the pipe 10. The present example applies to a pulverized coal furnace. The coal is contained in the bunker 11 from which it is withdrawn by a worm 12 and blown into the combustion and radiation chamber 1 by the air supplied by the blower 13. The plant is provided with three driving motors: 20 for the coal conveying worm 12, 21 for the blower 13 and 22 for the feed water pump 5. According to the invention a master control motor 15 is provided which in its turn is controlled for instance in accordance with the steam pressure variations in the consumers line, perceptible at the point 16. With the master control motor 15 is coupled a commutator 17 which carries contact segments, spaced axially and peripherally suitable distances apart. To the individual commutator segments are connected by means of brushes the windings of the three servo-motors 18, 19 and 23 which, for instance, through worm gear drives, are able to change the position of the switch levers of the pertaining shunt regulators 24, 25 and 26 for the driving motors 20, 21, 22. The current is supplied to the commutator 17 by the line 27 from D. C. mains. The current is transmitted to these servo-motors from the commutator by three different lines. Since it is assumed in the present example that the master control motor itself is controlled by the varying pressure in the consumers line, point 16 is connected by a pipe line 28 with a pressure responsive device of conventional form, comprising a cylinder which contains a pressure actuated piston 29, counterbalanced by a spring 30. As a matter of course any other suitable variable condition of the plant might be chosen instead of the pressure for controlling motor 15. A change-over switch 32 is coupled with the piston 29 by a rod 31.

The connection diagram of the control arrangement 15, 18 or 15, 19 or 15, 23 respectively is shown in Fig. 2. The commutator 17 driven by motor 15 is of insulating material and is provided with three axially spaced contact segments 33, 34, 35 which are so stepped circumferentially that they follow each other directly. To these contact segments current is supplied from a D. C. source through a slip-ring 36. The stator of each of the servo-motors 18, 19 and 23 contains three pairs of windings I, II, III, arranged 120° apart. Each rotor consists of a permanent magnet 37 coupled with the worm shaft 38, 39, 40 respectively. One member of each pair of windings is connected to one of the commutator brushes 41, 42, 43 while the other member is directly connected to the D. C. network (—pole).

The mode of operation of this arrangement is as follows: If the consumer requires less steam, the pressure in the pipe 16 rises. The consequence is an increase of the pressure on the steam side of the piston 29 which causes the change-over switch 32 to be closed at the left. Motor 15 is then connected to the D. C. supply, starts and turns commutator 17 in a certain direction. It will now be assumed that the brush 41, Fig. 2, runs on to the contact segment 34 during this movement of the controller while the brush 42 leaves segment 33. A south pole may now develop at the right hand inner end of winding II and at the left-hand inner end of this winding a north pole. The magnetic field thus generated rotates the armature 37 in a clockwise direction until it has set itself in the direction of this pair of coils. During the continuation of the rotation of commutator 17 the brush 43 runs on to the contact segment 35, the winding system III becomes energized and the armature again performs a rotation through an angle of 120° and so forth. The servo-motors 18, 19 and 23 thus run in fixed speed relation to motor 15 and change their direction with the latter, thereby adjusting the pertaining field regulators 24 to 26 in such a manner that the pertaining driving motors 20, 21 and 22 vary their speeds, because due to the decreased steam demand, less water, fuel and air should now be supplied. If by this function the pressure has dropped down again to its correct value the switch 32 is opened, master motor 15 stops, and the movement of the field regulator ceases. When the pressure drops below normal at the measuring point 16 the change-over switch 32 is thrown to the right, so that now master control motor 15 runs in the reverse direction, and thus also servo-motors 18, 19 and 23 run in the opposite direction and adjust the rheostats of the driving motors 21, 22 and 23 for a higher speed. It will be readily understood by those skilled in the art that the arrangement described so far represents the basic principles only of the system and that the arrangement may be further developed as to specific details required in each individual case. Such a development has, however, nothing to do with the invention per se.

It has already been pointed out that apart from the automatic adjustment of the nature just described an additional adjustment should be provided which is controlled either by hand or automatically.

This additional adjustment is illustrated for the blower motor 21, but it will be understood that similar additional adjustments may also be provided for motors of the feed water pump and the pulverized coal. Referring now to the blower motor 21, with the worm shaft 39 of its servo-motor 19 coupled to a motor 44 for which a contactor control is provided which may be rendered operative by the push-buttons 46, 47 as well as by an automatic control. 48 is an indicating instrument for the $CO_2$ contents of the flue gases which is provided with contacts. The flue gas tester is indicated by the reference numeral 49. As such testers are well known it has been indicated diagrammatically only. 50 are the two lines which lead from it to the contact indicating instrument 48. 51 and 52 are the two main contactors, 53 and 54 the auxiliary contactors which are controlled by the contact instrument 48. 55 is a battery for the automatic auxiliary control system. If more air is to be supplied by the blower 13, the push-button 46 is actuated so that the pair of contacts 56 is bridged. A circuit is then completed from the positive pole of the D. C. main across the contacts 56 and the solenoid coil 57 of contactor 51 to the negative pole. The contactor 51 responds and, to start with, opens the contacts 59. The line 58, see Fig. 2, is interrupted thereby so that the servo-motor 19 is disconnected from the D. C. network. When the contacts 59 are opened the contacts 60 and 61 are simultaneously closed. This connects the motor 44 to the D. C. supply, the motor starts and adjusts the field regulator 25 until the push-button 46 is released by the operator when the requisite speed of the blower 13 has been adjusted. If it is desired to run motor 44 in the reverse direction in order to reduce the quantity of air supplied by the blower 13, the push-button 47 is depressed and the contactor 52 then responds, and supplies current in reverse direction to motor 44, which is suitably designed to run in that case in opposite direction.

If the $CO_2$ content of the flue gases drops too low, the indicating instrument 48 will deflect its hand toward the top, for instance, so that it places itself against the contact 63. A circuit through battery 55 and solenoid coil 64 is closed in this way and the armature 65 is drawn upward so that the contacts 66 are bridged. This establishes a circuit by which solenoid coil 67 is connected to the main D. C. supply, the same as if push button 47 had been operated, and motor 44 now controls the rheostat for the blower motor 21 so that the speed of blower 13 is reduced until the $CO_2$ content has again attained its normal value. Conversely in case of too high $CO_2$ content the solenoid coil 68 is energized and reverses motor 44, the same as if button 46 had been operated and the blower 13 is speeded up for a larger air supply. This system of control is likewise to be understood as an example only. It is obvious that, for instance, an additional motor might be provided for the field regulator 24 which might then be controlled in dependence of the flue gas temperature. How this control might be designed in individual cases is well known to the expert so that a special illustration appears superfluous.

I claim as my invention:—

1. In an automatic feeding control system for steam boilers, having a fuel supply device motor, an air supply device motor and a feed water supply device motor, and individual regulating devices for said motors, an intermittently operable master control servo-motor, means responsive to variations in the supply conditions of the generated steam, for controlling said master motor with respect to its operation and direction of rotation, an operating servo-motor for each of said regulating devices, and means operated by said master control motor for simultaneously controlling all of said operating servo-motors to operate simultaneously with and at a fixed speed ratio to said master motor and in accordance with the rotation direction of the latter, to operate all of said supply devices simultaneously and uniformly at a desired ratio.

2. In an automatic feeding control system for steam boilers, having a fuel supply device motor, an air supply device motor and a feed water supply device motor, and individual regulating devices for said motors, an intermittently operable master control servo-motor, means responsive to variations in the supply conditions of the generated steam, for controlling said master motor with respect to its operation and direction of rotation, an operating servo-motor for each of said regulating devices, and a commutator coupled to said master control motor and constructed to supply operating current to said operating servo-motors simultaneously in proper phase relation to simultaneously run said operating servo-motors at a fixed speed ratio to said master motor and in accordance with the rotation direction of the latter, to operate all of said supply devices simultaneously and uniformly at a desired ratio.

3. In an automatic feeding control system for steam boilers, having a fuel supply device motor, an air supply device motor and a feed water supply device motor, and individual regulating devices for said motors, and intermittently operable master control servo-motor, means responsive to variations in the supply conditions of the generated steam, for controlling said master motor with respect to its operation and direction of rotation, an operating servo-motor for each of said regulating devices, and means operated by said master control motor for simultaneously controlling all of said operating servo-motors to operate simultaneously with and at a fixed speed ratio to said master motor and in accordance with the rotation direction of the latter, to operate all of said supply devices simultaneously and uniformly at a desired ratio, and means for actuating the motor regulating device of at least one medium supply device independently of its normal servo-motor actuation for varying at will the medium supply by that device, irrespective of the operation of the other medium supply devices.

4. In an automatic feeding control system for steam boilers, having a fuel supply device motor, an air supply device motor and a feed water supply device motor, and individual regulating devices for said motors, an intermittently operable master control servo-motor, means responsive to variations in the supply conditions of the generated steam, for controlling said master motor with respect to its operation and direction of rotation, an operating servo-motor for each of said regulating devices, and a commutator coupled to said master control motor and constructed to supply operating current to said operating servo-motors simultaneously in proper phase relation to simultaneously run said operating servo-motors at a fixed speed ratio to said master motor and in accordance with the rotation direction of the latter, to operate all of said supply devices simultaneously and uniformly at a desired ratio, and hand controlled means for actuating the motor regulating device of at least one medium supply device independently and to the exclusion of its normal servo-motor actuation, for varying at will the medium supply by that device, irrespective of the operation of the other medium supply devices.

5. In an automatic feeding control system for steam boilers, having a fuel supply device motor, an air supply device motor and a feed water supply device motor, and individual regulating devices for said motors, an intermittently operable master control servo-motor, means responsive to variations in the supply conditions of the generated steam, for controlling said master motor with respect to its operation and direction of rotation, an operating servo-motor for each of said regulating devices, and means operated by said master control motor for simultaneously controlling all of said operating servo-motors to operate simultaneously with and at a fixed speed ratio to said master motor and in accordance with the rotation direction of the latter, to operate all of said supply devices simultaneously and uniformly at a desired ratio, and an independently operable correcting servo-motor for the motor regulating device of the air supply device, means responsive to the $CO_2$ content of the combustion gases, and circuit connections controlled by said last-named responsive means for controlling said correcting servo-motor to correctively control in turn the air supply motor in accordance with the $CO_2$ content of the combustion gases, irrespective of the operation of the supply devices for the other media, and means for rendering the normal operating servo-motor for the air supply motor regulating device inoperative during the operation of the correcting servo-motor.

6. In an automatic feeding control system for steam boilers, having a fuel supply device motor, an air supply device motor and a feed water supply device motor, and individual regulating devices for said motors, an intermittently operating master control servo-motor, means responsive to variations in the supply conditions of the generated steam, for controlling said master motor with respect to its operation and direction of rotation, an operating servo-motor for each of said regulating devices, and means operated by said master control motor for simultaneously controlling all of said operating servo-motors to operate simultaneously with and at a fixed speed ratio to said master motor and in accordance with the rotation direction of the latter, to operate all of said supply devices simultaneously and uniformly at a desired ratio, and an independently operable correcting servo-motor for the motor regulating device of the air supply device, a device responsive to the $CO_2$ content of the combustion gases, and circuit connections controlled by the response of said $CO_2$ device for controlling said correcting servo-motor to correctively control in turn the air supply motor regulator in accordance with the $CO_2$ content of the combustion gases, irrespective of the operation of the supply devices for the other media, and means controlled by said last-named circuit connections for rendering the normal operating servo-motor for the air motor regulating device inoperative during the operation of the correcting servo-motor, and circuit connections for selectively controlling said correcting servo-motor by hand.

In testimony whereof I affix my signature.

HEINZ RABE.